(12) United States Patent
Lu et al.

(10) Patent No.: US 9,588,696 B2
(45) Date of Patent: Mar. 7, 2017

(54) MONTGOMERY MODULAR MULTIPLICATION-BASED DATA PROCESSING METHOD

(71) Applicant: Feitian Technologies Co., Ltd., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 14/434,275

(22) PCT Filed: Dec. 2, 2013

(86) PCT No.: PCT/CN2013/088305
§ 371 (c)(1),
(2) Date: Apr. 8, 2015

(87) PCT Pub. No.: WO2014/101632
PCT Pub. Date: Jul. 3, 2014

(65) Prior Publication Data
US 2015/0293698 A1    Oct. 15, 2015

(30) Foreign Application Priority Data
Dec. 24, 2012 (CN) .......................... 2012 1 0566979

(51) Int. Cl.
G06F 7/38 (2006.01)
G06F 3/06 (2006.01)
G06F 7/72 (2006.01)

(52) U.S. Cl.
CPC ............ G06F 3/061 (2013.01); G06F 3/0655 (2013.01); G06F 3/0673 (2013.01); G06F 7/728 (2013.01)

(58) Field of Classification Search
CPC ...... G06F 3/061; G06F 3/0655; G06F 3/0673; G06F 7/728
(Continued)

(56) References Cited

U.S. PATENT DOCUMENTS

2007/0233772 A1   10/2007   Mathew et al.
2009/0089350 A1*  4/2009   Sauzet .................. G06F 7/728
                                                           708/491

FOREIGN PATENT DOCUMENTS

CN         1731345 A        2/2006
CN         1967469 A        5/2007
CN       102999313 A        3/2013

OTHER PUBLICATIONS

International Search Report dated Jan. 23, 2014 corresponding to PCT/CN2013/088305, 10 pp.
(Continued)

Primary Examiner — Tan V. Mai
(74) Attorney, Agent, or Firm — Ohlandt, Greeley, Ruggiero & Perle, LLP (57) ABSTRACT

Disclosed is a Montgomery modular multiplication-based data processing method. The method includes: a CPU initializing a fifth random access memory, and performing the following operations on content in a unit of a word in a second random access memory, namely: (1) calling a multiplying and adding module to multiply one word of the content of the second random access memory and content of a first random access memory and add the product to content of the fifth random access memory; (2) extracting one word from an operation result of the step (1) and multiplying the word with content of a constant register, and writing a low-order word of the multiplied result into a fourth register; (3) calling the multiplying and adding module to multiply content of a fourth register with content of a third random access memory and add the product to the content of the fifth (Continued)

random access memory; and finally, outputting the content of the fifth random access memory according to the content of the third memory.

11 Claims, 3 Drawing Sheets

(58) Field of Classification Search
 USPC .......................................................... 708/491
 See application file for complete search history.

(56) References Cited

OTHER PUBLICATIONS

International Written Opinion dated Jan. 23, 2014 corresponding to PCT/CN2013/088305, 5 pp.

* cited by examiner

MONTGOMERY MODULAR MULTIPLICATION-BASED DATA PROCESSING METHOD

The present application claims priority to Chinese Patent Application 201210566979.X with name of method for data processing based on Montgomery modular multiplication, filed on Dec. 24, 2012, which is incorporated herein by reference in its entirety.

FIELD

The present disclosure relates to computer technology field, more particularly to a method for data processing based on Montgomery modular multiplication.

BACKGROUND

In hardware implementation of a big integer modular multiplication algorithm of conventional technology, Montgomery modular multiplication algorithm is regarded as the most effective algorithm, which is an algorithm most suitable for hardware implementation as well.

At present, designing for implementing a modular multiplier of a big integer modular multiplication mostly employs Montgomery algorithm and its variants. The present design of the modular multiplier is for storing an intermediate result which is read when required in a next cycle; it is required to read and write a storage device frequently. However, performing reading and writing on the storage device requires taking clock periods so that the working efficiency of the modular multiplier is affected and data processing rate based on Montgomery modular multiplication is reduced; for example, the present Montgomery algorithm has a defect that the operation speed is slow for hardware implementation, which results in low efficiency and low speed of encryption algorithm such as RSA and ECC, etc.

SUMMARY

In order to solve problems exist in conventional technology, the present invention provides a method for data processing based on Montgomery modular multiplication.

The technical solution of the present invention is as the following: a method for data processing based on Montgomery modular multiplication, where a first random memory is configured to store a multiplier, a second random memory is configured to store a multiplicand and a third random memory is configured to store a modulus and the method including:

step 1, including: initializing, by a CPU, a fifth random memory and initializing a first offset and a second offset; where the first offset is for representing an offset address which is relative to a base address in the second random memory; the second offset is for representing an offset address which is relative to a base address in the fifth random memory.

step 2, including: reading, by the CPU, one word from the second random memory according to the first offset and writing the word into a first arithmetic register;

step 3, including: invoking, by the CPU, a multiply-add module to perform an operation of multiplying content of the first arithmetic register and content of the first random memory and adding a multiplying result to content of the fifth random memory, writing a computing result obtained into the fifth random memory ordered from a low bit to a high bit according to the second offset;

step 4, including: reading, by the CPU, one word from the fifth random memory and writing the word into a second arithmetic register according to the second offset, multiplying content of the second arithmetic register with content of a constant register and writing a low bit of a multiplying result into a fourth arithmetic register;

step 5, including: reading, by the CPU, content of the fourth register, content of the third random memory and the content of the fifth random memory; invoking the multiply-add module to multiply the content of the fourth register and the content of the third random memory and to add the multiplication result to the content of the fifth random memory; adding 1 to the second offset and writing a computing result obtained from the multiply-add module according to the second offset ordered from a low bit to a high bit into the fifth random memory;

step 6, including: determining, by the CPU, whether the first offset is equal to a preset step, execute step 8 if the first offset is equal to the preset step; execute step 7 if the first offset is not equal to the preset step;

step 7, including: adding 1 to the first offset and going back to step 2;

step 8, including: reading, by the CPU, the content of the fifth random memory and the content of the third random memory, determining whether a value of the content of the fifth random memory is more than or equal to a value of the content of the third random memory, execute step 9 if the value of the content of the fifth random memory is more than or equal to the value of the content of the third random memory, executing step 10 if the value of the content of the fifth random memory is not more than or equal to the value of the content of the third random memory;

step 9, comprising: subtracting, by the CPU, the content of the third random memory from the content of the fifth random memory, and writing a subtraction result into the fifth random memory ordered from a low bit to a high bit according to the second offset; executing step 10; and step 10, comprising: outputting, by the CPU, the content of the fifth random memory.

step 2 includes: reading one word corresponding to a position obtained after by shifting the first offset left from the base address of the second random memory and writing the word into the first arithmetic register.

The multiply-add module is configured to implement a multiplication operation and an addition operation supported by the CPU.

Invoking, by the CPU, a multiply-add module to perform an operation of multiplying content of the first arithmetic register and content of the first random memory and adding a multiplication result to content of the fifth random memory in step 3 includes:

step 201, including: determining, by the CPU, whether the first offset is 0, executing step 210 if the first offset is 0; executing step 202 if the first offset is not 0;

step 202, including: initializing a carry register and initializing an index variable;

step 203, including: obtaining, by the CPU, one word from the first random memory according to the index variable and writing the word into a third arithmetic register, obtaining one word from the fifth random memory according to the index variable and writing the word into the fourth arithmetic register;

step 204, including: multiplying, by the CPU, content of the first arithmetic register with content of the third arithmetic register, and adding the multiplication result to content of the fourth arithmetic register to obtain a first computing result;

step 205, including: adding, by the CPU, the first computing result to content of the carry register to obtain a second computing result;

step 206, including: writing, by the CPU, a first word of a high bit of the second computing result into the carry register and writing rest words of the second computing result into the fifth random memory according to the index variable;

step 207, including: determining, by the CPU, whether the index variable is equal to a preset word length, executing step 209 if the index variable is equal to the preset word length; executing step 208 if the index variable is not equal to the preset word length;

step 208, including: adding 1 to the index variable and going back to execute step 203;

step 209, including: reading, by the CPU, content of the carry register and writing the content of the carry register into the fifth random memory according to the index variable; and step 210, including: outputting, by the CPU, content of the fifth random memory as a computing result of step 3.

step 203 includes obtaining one word at a storage position corresponding to a current index variable in the first random memory and writing the word into the third arithmetic register; obtaining one word at the storage position corresponding to the current index variable in the fifth random memory and writing the word into the fourth arithmetic register.

Writing rest words of the second computing result into the fifth random memory according to the index variable in step 206 includes writing the rest words the second computing result, except for the first word of the high bit, into a storage position corresponding to a current index variable in the fifth random memory ordered from a low bit to a high bit.

Writing a computing result obtained into the fifth random memory ordered from a low bit to a high bit according to the second offset in step 3 and step 5 includes writing the computing result from the position obtained by shifting the second offset left from the base address of the fifth random memory ordered from a low bit to a high bit.

Reading, by the CPU, one word from the fifth random memory according to the second offset and writing the word into the second arithmetic register in step 4 includes reading a word corresponding to a position obtained by shifting a second offset left from the base address of the fifth random memory and writing the word into the second arithmetic register.

Invoking the multiply-add module to multiply the content of the fourth register with the content of the third random memory and to add a multiplication result to the content of the fifth random memory in step 5 includes:

step 301, including: determining, by the CPU, whether the first offset is 0, executing step 310 if the first offset is 0; executing step 302 if the first offset is not 0;

step 302, including: initializing a carry register and initializing an index variable;

step 303, including: obtaining, by the CPU, one word form the third random memory according to the index variable and writing the word into a third arithmetic register; obtaining one word from the fifth random memory according to the index variable and writing the word into a fourth arithmetic register;

step 304, including: multiplying, by the CPU, content of the third arithmetic register with content of the fourth register and adding a multiplication result to content of the fourth arithmetic register to obtain a third computing result;

step 305, including: adding, by the CPU, the third computing result to content of a carry register to obtain a fourth computing result;

step 306, including: writing, by the CPU, a first word of a high bit of the four computing result into the carry register and writing rest words of the four computing result into the fifth random memory according to the index variable;

step 307, including: determining, by the CPU, whether the index variable is equal to a preset word length, execute step 309 if the index variable is equal to the preset word length; execute step 308 if the index variable is not equal to the preset word length;

step 308, including: adding 1 to the index variable and going back to execute step 303;

step 309, including: reading, by the CPU, content of the carry register and writing the content of the carry register into a fifth random memory according to the index variable; and step 310, including: outputting, by the CPU, content of the fifth random memory as a operating result of step 5.

Writing a subtract result into the fifth random memory ordered from a low bit to a high bit according to the second offset in step 9 includes:

writing the subtract result into the position obtained by shifting the second offset left from the base address of the fifth random memory ordered from a low bit to a high bit.

The present invention provides a method for data processing based on Montgomery modular multiplication with high efficient, which may achieve effects of improving data processing rate by reducing operation period of a system and improving module-multiply efficiency, especially may improve efficiency and speed of data encryption and decryption when the method is applied in data encryption algorithm.

DETAILED DESCRIPTION

The technical solutions of the embodiments of the disclosure are described clearly and completely in conjunction with the accompanying drawings as follows.

An embodiment of the disclosure provides a method for data processing based on Montgomery modular multiplication, which is introduced via an example of a process that a CPU of a computer performs a modular multiplication operation on data. In the present embodiment, a first random memory is for storing a multiplier in a modular multiplication operation; a second random memory is for storing a multiplicand in the modular multiplication operation; a third random memory is for storing a modulus in the modular multiplication operation; a fourth register is for storing an intermediate operand; a fifth random memory is for storing a computing result of the modular multiplication operation and a computing result of multiply-add module in the process of the modular multiplication operation; a constant register is for storing a preset constant.

In the present embodiment, a length of the multiplier, the multiplicand and the modulus are represented by a machine word length n and n≥0, a length of an optional word is 32 bit; optionally, n=16, that is the length of 16 is 512 bits. Memory space of the first random memory, the second random memory and the third random memory, which is selected according to a big integer used in an operation, is more than or equal to n; n may be selected to reduce occupied space; memory space of the fifth random memory is more than or equal to 2n+1; 2n+1 may be selected to reduce occupied space; memory space of the fourth register or the constant register is more than or equal to 1 word; 1 word may be selected to reduce occupied space.

Figure 1:
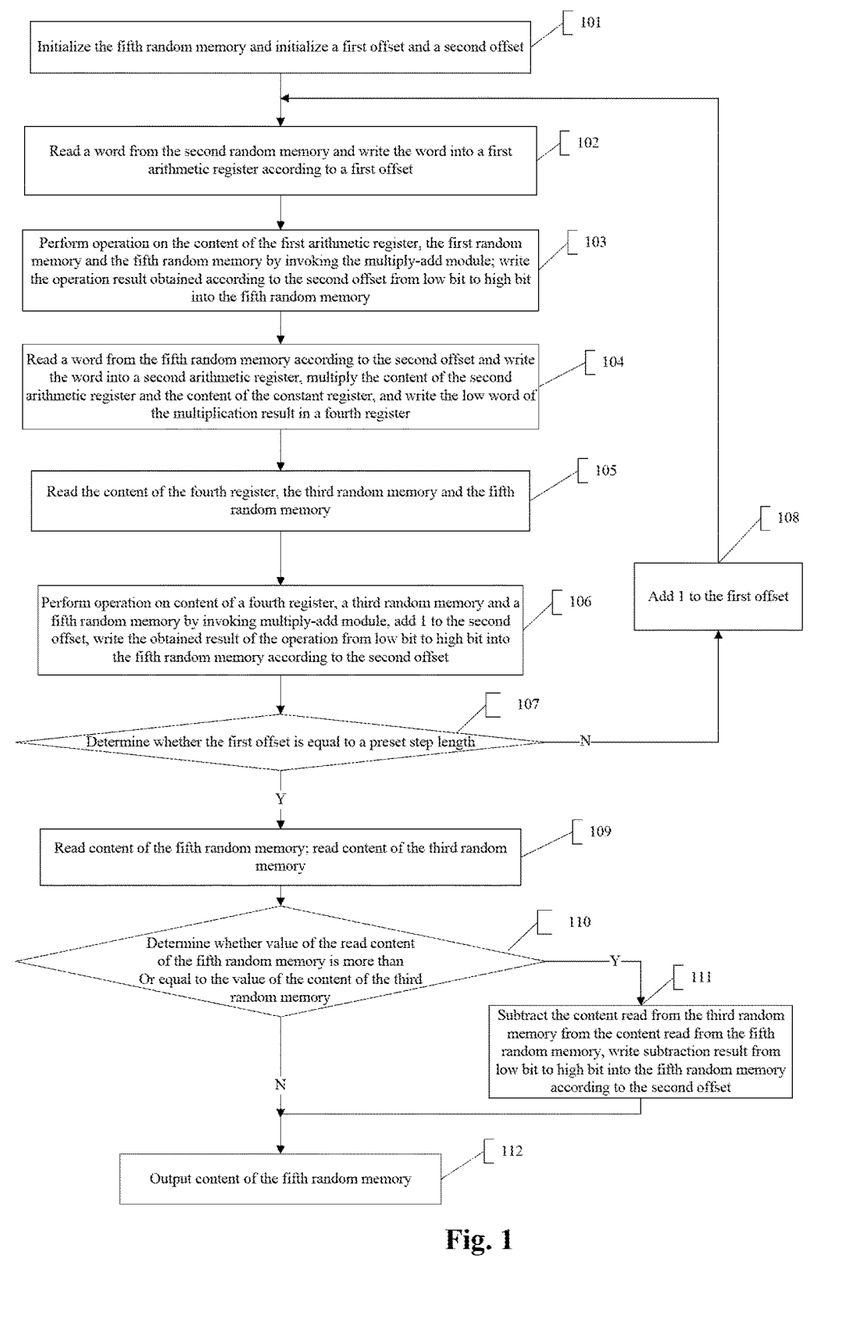
FIG. 1 a flow chart of a method for data processing based on Montgomery modular multiplication.

As shown in FIG. 1, the method for data processing performed by a CPU processor based on Montgomery modular multiplication includes steps 101 to 112.

In step 101, a fifth random memory is initiated and a first offset and a second offset are initiated.

The content of the fifth random memory is initiated to be 0 and the first offset and the second offset are initiated to be 0. The first offset is for representing an offset address which is relative to a base address in the second random memory. The second offset is for representing an offset address which is relative to a base address in the fifth random memory.

In step 102, one word is read from a second random memory and the word is written into a first arithmetic register according to the first offset.

Reading a word from the second random memory and writing the word into the first operating register according to a first offset includes: reading a corresponding word obtained by shifting the first offset left from the base address of the second random memory and writing the word into the first arithmetic register.

In the present embodiment, optionally the size of the memory space of the first arithmetic register can set as 1 word for storing one word read from the second random memory according to the first offset in computing process.

Optionally, in the present embodiment, the content of the second random memory may be:
91D46B9B F7BF6BB6 37EF4369 9B20C28E
5C312C18 83F0AB86 CE7D029D 67400BCB
CB024F12 9EFEC843 C7BA6010 97275C41
84FA3D48 FF5CA205 761382C0 CA6F360C.

In the case that the first offset is 0, the word read from the second random memory is CA6F360C.

In step 103, an operation is performed on content of the first arithmetic register, content of the first random memory and content of the fifth random memory by invoking a multiply-add module; a computing result obtained is written, according to the second offset, ordered from a low bit to a high bit into the fifth random memory.

In the present embodiment, the multiply-add module may implement a multiplication operation and an addition operation supported by the CPU, which is for multiplying the content of the first operation register with the content of the first random memory and then adding a multiplication result to the content of the fifth random memory to obtain an computing result; then writing the computing result into the fifth random memory according to the second offset.

Writing the computing result into the fifth random memory according to the second offset includes:
writing the computing result into the fifth random memory ordered from a low bit to a high bit from a position obtained by shifting the second offset left from the base address in the fifth random memory.

Optionally, in the present embodiment, in the case that the first offset is 0, the content of the first arithmetic register used in the operation is CA6F360C; the content of the fifth random memory is 0.

The content of the first random memory is:
FA371FB2 CA0972D1 A51D20FC D9B12C38
830024AE 5F66E7C7 B13C5C14 17D0A993
5EF27616 D1D36B0E 9E3015E2 37CB5C8F
3F7979D9 CC2085D2 D0E2B6BD E4D00064.

The content written into the fifth random memory of the present step is:
00000000 00000000 00000000 00000000
00000000 00000000 00000000 00000000
00000000 00000000 00000000 00000000
00000000 00000000 00000000 C5DC31BD
2D3641B1 ABD92E50 B3BB127C 5780E849
AAA110CE 3F267692 D1C1873E F15E853E
CDBC2679 62A6A22B 8BFB6695 AD40EDEC
49E6D2F6 CCFC3470 B00EF5A9 AD311CB0.

In step 104, one word is read from the fifth random memory according to the second offset and the word is written into a second arithmetic register, multiply content of the second arithmetic register and content of a constant register, and write a low bit word of a multiplication result into a fourth register.

Reading a word from the fifth random memory according to the second offset and writing the word into the second arithmetic register includes: reading a corresponding word obtained by shifting the second offset left from the base address of the second random memory and writing the word into the second arithmetic register. Optionally, the size of the memory space of the second arithmetic register may be set as 1 word, which is for storing one word read from the fifth random memory according to the second offset in computing process.

Optionally, the content of the second arithmetic register used in the operation in the present embodiment is AD311CB0; the content of the constant register is 1A788E41.

The content of the fourth register written into the present step is 89E1E8B0.

step 105, content of the fourth register, content of a third random memory and content of the fifth random memory is read.

Optionally, in the present embodiment, the read content of the third random memory is:
A9E55F8A A3D41743 634D40B3 646FA84E
7628CEAB 9B597420 4F226B6F 80E6AECF
76CE3C52 0632A7EF 8053CEC7 A30E4F9D
BFE8E6A4 E4A32F00 81564573 B4117E3F.

In step 106, operation on the content of the fourth register, the content of the third random memory and the content of the fifth random memory is performed by invoking the multiply-add module, the second offset is added by 1, an obtained result of the operation is written ordered from a low bit to a high bit into the fifth random memory according to the second offset.

In the present embodiment, the multiply-add module may implement a multiplication operation and an addition operation supported by CPU and is for multiplying the content of the fourth register with the content of the third random memory, then adding a multiplication result to the content of the fifth random memory to obtain a computing result and adding 1 to the second offset, writing the computing result to the fifth random memory according to the second offset.

Writing the obtained computing result ordered from a low bit to a high bit in the fifth random memory according to the second offset includes: writing the computing result ordered from a low bit to a high bit into a position obtained by shifting current second offset left from the base address in the fifth random memory.

Optionally, content written into the fifth random memory in the present step is:

00000000 00000000 00000000 00000000
00000000 00000000 00000000 00000000
00000000 00000000 00000000 00000000
00000000 00000000 00000001 215DDEE4
04041356 051CDD28 D9E5280B 7EFD69C7
5CF11456 78A28D3F 83C42F05 494E8116
4B9882E0 52D7C671 4CB773CA 2497EF6C
40531B1B 746DD1FD C05E3055 00000000.

In step 107, whether the first offset is equal to a preset step is determined, step 109 is executed if the first offset is equal to the preset step; step 108 is executed if the first offset is not equal to the preset step.

In the present embodiment, the preset step is 15.

In step 108, the first offset is added by 1; step 102 is executed.

In step 109, the content of the fifth random memory is read; the content of the third random memory is read.

In step 110, whether a value of read content of the fifth random memory is more than or equal to a value of the content of the third random memory is determined, step 111 is executed if the value of read content of the fifth random memory is more than or equal to the value of the content of the third random memory; step 112 is executed if the value of read content of the fifth random memory is not more than or equal to the value of the content of the third random memory.

In step 111, the content read from the fifth random memory is subtracted from the content read from the third random memory from, a subtraction result is written ordered from a low bit to a high bit into the fifth random memory according to the second offset; step 112 is executed.

In the present embodiment, writing a subtraction result ordered from a low bit to a high bit into the fifth random memory according to the second offset includes: writing the subtraction result ordered from a low bit to a high bit into the position obtained by shifting the second offset left from the base address into the fifth random memory.

step 112, the content of the fifth random memory is output.

An output content of the fifth random memory in the present step is a result of the modular multiplication operation. Optionally, the output content of the fifth random memory is 65F36D6C AD704FF4 06219952 FA62DCC6
0F9892D 1 BBC23E74 1 EFECDE3 4717BDA3
55545D9E 18A97A65 59EB8832 F31DD5BC
397DA4B5 773E8EB3 8F89123B 0A05453E.

The multiply-add module mentioned in the present embodiment is for implementing a multiplication operation and an addition operation of a big integer supported by the CPU. In the following, detailed description is given by taking an example that the multiply-add module is applied to perform a multiplication and addition operation of a big integer in step 103 and step 106 of FIG. 1. Hereby, a carry storage register is for storing a carry of the multiplication and addition operation, the size of a storage space of the carry storage register is more than or equal to one word; one word may be selected to reduce occupied space.

Figure 2:
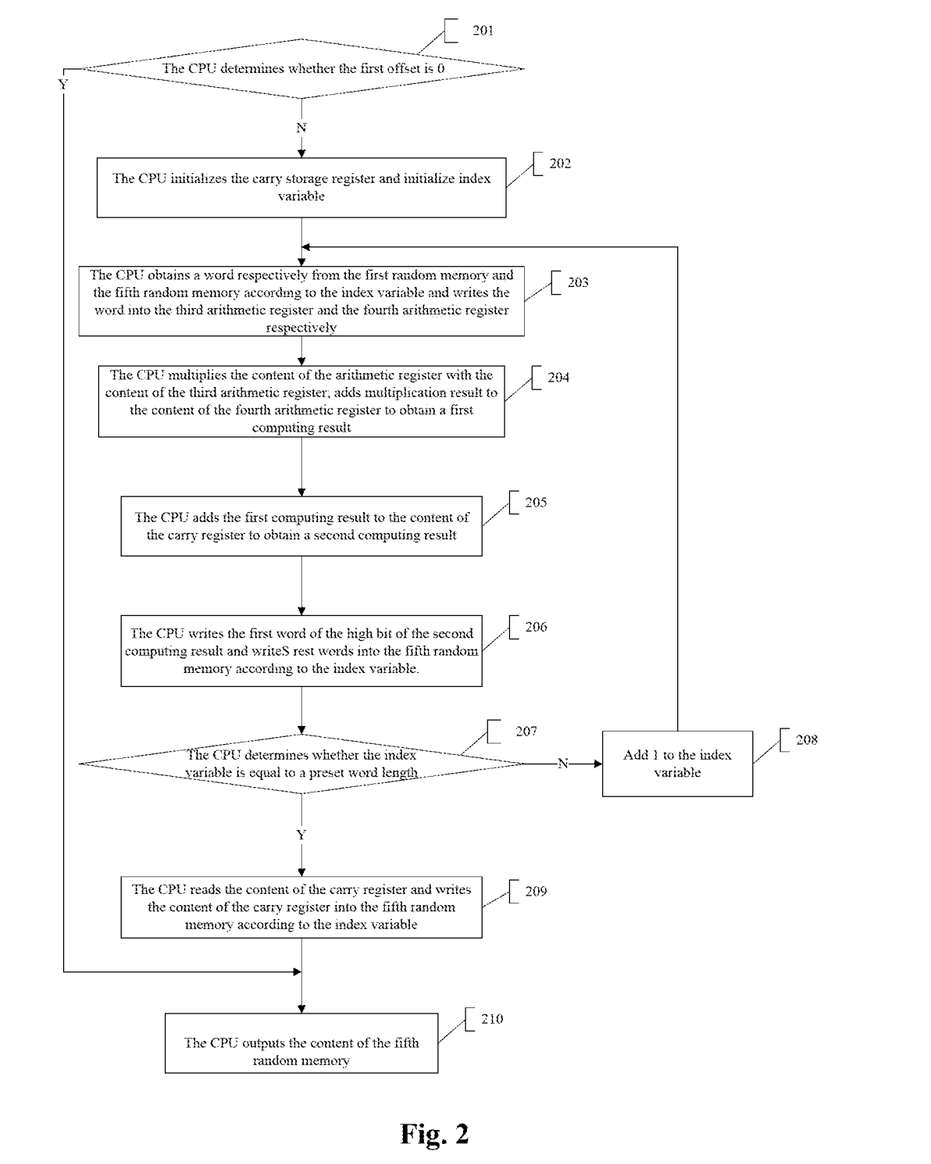
FIG. 2 is a diagram for a process of invoking a multiply-add module to perform operation in step 103 of FIG. 1.

The process of performing operation on the content of the first arithmetic register, the content of the first random memory and the content of the fifth random memory by invoking multiply-add module in step 103 of FIG. 1 may be shown in FIG. 2, which includes step 201 to step 210.

In step 201, the CPU determines whether the first offset is 0, step 210 is executed if the first offset is 0; step 202 is executed if the first offset is not 0.

In present embodiment, the first offset is for indicating an offset address which is relative to a base address in the second random memory.

In step 202, the CPU initializes a carry storage register and initializes an index variable.

In the present embodiment, optionally initializing the carry storage register may be initializing content of the register to be 0; optionally, initializing the index variable may be initializing the index variable to be 1.

In step 203, the CPU obtains one word from the first random memory according to the index variable and writes the word into the third arithmetic register; and obtains one word from the fifth random memory according to the index variable and writes the word into the fourth arithmetic register.

In the present embodiment, obtaining one word from the first random memory according to the index variable and writing the word into the third arithmetic register; and obtaining one word from the fifth random memory according to the index variable and writing the word into the fourth arithmetic register includes: obtaining one word at the storage position corresponding to the current index variable from the first random memory and writing the word into the third arithmetic register and obtaining one word at the storage position corresponding to the current index variable from the fifth random memory writing the word into the fourth arithmetic register. For example, a current index variable is 1, the first word of the low bit of the first random memory is written into the third arithmetic register and the first word of the low bit of the fifth random memory is written into the fourth arithmetic register.

Optionally, in the present embodiment, the third arithmetic register is for storing the multiplier of the multiply-add operation; the fourth arithmetic register is for storing addend of the multiply-add operation; the size of the storage space of the third arithmetic register and the fourth arithmetic register optionally may be one word.

In step 204, the CPU multiplies the content of the first arithmetic register by the content of the third arithmetic register; adds a multiplication result to the content of the fourth arithmetic register to obtain a first computing result.

In the present embodiment, the first computing result may be stored in a temporary register; the size of the storage space of the temporary register optionally may be two words. Before step 205 is executed, the method includes: reading the first computing result from the temporary register.

In step 205, the CPU adds the first computing result to the content of the carry register to obtain a second computing result.

In step 206, the CPU writes a first word of a high bit of the second computing result into the carry register and writes rest words into the fifth random memory according to the index variable.

In the present embodiment, writing the rest words into the fifth random register according to the index variable includes that the CPU writes the rest words ordered from a low bit to a high bit except for the first word of the high bit in the second computing result into a storage position corresponding to a current index variable in the fifth random memory. For example, the current index variable is 1; the rest words, which are before the word of the most significant bit in the second computing result, are written into the position from the first word of the low bit of the fifth random memory.

In step 207, the CPU determines whether the index variable is equal to a preset word length, step 209 is executed if the index variable is equal to the preset word length; step 208 is executed if the index variable is not equal to the preset word length.

In the present embodiment, specifically, the CPU determines whether the index variable is equal to n, step 209 is executed if the index variable is equal to n, step 208 is executed if the index variable is not equal to n.

In step 208, the CPU adds the index variable with 1 and goes back to step 203.

step 209, the CPU reads the content of the carry register and writes the content of the carry register into the fifth random memory according to the index variable.

In the present embodiment, the CPU writes the read content of the carry register into a storage position corresponding to the (n+1)th word of the fifth random memory.

In step 210, the CPU outputs the content of the fifth random memory.

In the present step, the output content of the fifth random memory is the computing result of the multiply-add operation.

Figure 3:
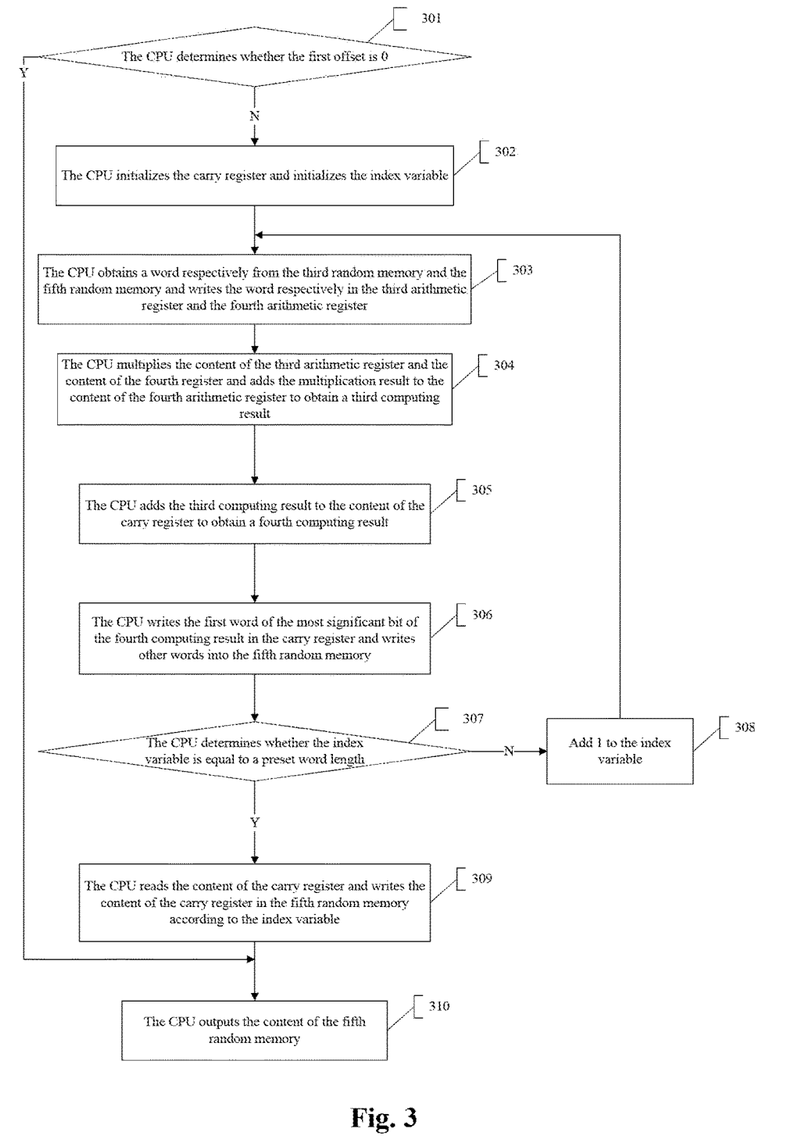
FIG. 3 is a diagram for a process of invoking the multiply-add module to perform operation in step 106 of FIG. 1.

In FIG. 1, the process of performing operation on the read data by invoking the multiply-add module may be shown in FIG. 3, which includes step 301 to step 310.

In step 301, the CPU determines whether the first offset is 0, step 310 is executed if the first offset is 0; step 302 is executed if the first offset is not 0.

In the present embodiment, the first offset is for indicating an offset address which is relative to the base address in the second random memory.

In step 302, the CPU initializes a carry register and initializes an index variable.

In the present embodiment, initializing the carry register optionally may be initializing content of the carry register to be 0; initializing the index variable optionally may be initializing the index variable to be 1.

In step 303, the CPU obtains a word from the third random memory and writes the word into the third arithmetic register; and obtains a word from the fifth random memory and writes the word into the fourth arithmetic register.

In the present embodiment, obtaining a word from the third random memory and writing the word into the third arithmetic register; and obtaining a word from the fifth random memory and writing the word into the fourth arithmetic register includes obtaining the word at the storage position corresponding to current index variable from the third random memory and writing the word into the third arithmetic register and obtaining the word at the storage position corresponding to current index variable from the fifth random memory and writing the word into the fourth arithmetic register. For example, the current index variable is n, the obtained nth word of the least significant bit of the third random memory is written into the third arithmetic register and the obtained nth word of the least significant word of the fifth random memory is written into the fourth arithmetic register.

Optionally, in the present embodiment, the third arithmetic register is for storing a multiplier of the multiply-add operation; the fourth arithmetic register is for storing an addend in the multiply-add operation; optionally, the size of the storage space of third arithmetic register and the fourth arithmetic register is one word.

In step 304, the CPU multiplies the content of the third arithmetic register by the content of the fourth register and adds a multiplication result to the content of the fourth arithmetic register to obtain a third computing result.

In the present embodiment, the third computing result may be stored in a temporary register; the storage space of the temporary register optionally may be two machine word lengths; before step 305 is executed, the method includes: reading the third computing result from the temporary register.

In step 305, the CPU adds the third computing result to the content of the carry register to obtain a fourth computing result.

In step 306, the CPU writes a first word of the most significant bit of the fourth computing result into the carry register and writes rest words into the fifth random memory according to the index variable.

In the present embodiment, writing the rest words into the fifth random register according to the index variable includes that the CPU writes the rest words ordered from a low bit to a high bit, except for the first word of the high bit in the fourth computing result, into the storage position corresponding to the current index variable in the fifth random memory. For example, the current index variable is n, except for the first word of the high bit of the fourth computing result, the rest words of the fourth computing result are written into the fifth random memory from the nth word of the low bit orderly.

In step 307, the CPU determines whether the index variable is equal to preset word length, executes step 309 if the index variable is equal to preset word length; executes step 308 if the index variable is not equal to preset word length.

In the present embodiment, the CPU determines whether the index variable is equal to n, executes step 309 if the index variable is equal to n; executes step 308 if the index variable is not equal to n; optionally, n=16.

In step 308, the CPU adds 1 to the index variable, and goes back to step 303.

In step 309, the CPU reads the content of the carry register and writes the content of the carry register into the fifth random memory according to the index variable.

In the present embodiment, the CPU writes the read content of the carry register into the storage position corresponding to the (n+1)th word into the fifth random memory.

In step 310, the CPU outputs the content of the fifth random memory.

The content of the fifth random memory output in the present step is the computing result of the multiply-add operation.

The above description is only the embodiments of the invention, and the protection scope thereof is not limited herein. The variation or replacement within the technical scope made by those skilled in the art may fall into the protection scope of the invention. Therefore, the protection scope of the invention may be subject to the protection scope of the claims.

The invention claimed is:

1. A data processing method based on Montgomery modular multiplication, wherein a first random memory is configured to store a multiplier, a second random memory is configured to store a multiplicand and a third random memory is configured to store a modulus, the method comprises:

step 1, comprising: initializing, by a CPU, a fifth random memory and initializing a first offset and a second offset;

step 2, comprising: reading, by the CPU, one word from the second random memory according to the first offset and writing the word into a first arithmetic register;

step 3, comprising: invoking, by the CPU, a multiply-add module to perform an operation of multiplying content of the first arithmetic register and content of the first random memory and adding a multiplying result to content of the fifth random memory, writing a computing result obtained into the fifth random memory ordered from a low bit to a high bit according to the second offset;

step 4, comprising: reading, by the CPU, one word from the fifth random memory and writing the word into a second arithmetic register according to the second offset, multiplying content of the second arithmetic register with content of a constant register and writing a low bit of a multiplying result into a fourth register;

step 5, comprising: reading, by the CPU, content of the fourth register, content of the third random memory and the content of the fifth random memory; invoking the multiply-add module to multiply the content of the fourth register and the content of the third random memory and to add a multiplication result to the content of the fifth random memory; adding 1 to the second offset and writing a computing result obtained from the multiply-add module according to the second offset ordered from a low bit to a high bit into the fifth random memory;

step 6, comprising: determining, by the CPU, whether the first offset is equal to a preset step, executing step 8 if the first offset is equal to the preset step; executing step 7 if the first offset is not equal to the preset step;

step 7, comprising: adding 1 to the first offset and going back to step 2;

step 8, comprising: reading, by the CPU, the content of the fifth random memory and the content of the third random memory, determining whether a value of the content of the fifth random memory is more than or equal to a value of the content of the third random memory, execute step 9 if the value of the content of the fifth random memory is more than or equal to the value of the content of the third random memory, executing step 0 if the value of the content of the fifth random memory is not more than or equal to the value of the content of the third random memory;

step 9, comprising: subtracting, by the CPU, the content of the third random memory from the content of the fifth random memory, and writing a subtraction result into the fifth random memory ordered from a low bit to a high bit according to the second offset; executing step 10; and step 10, comprising: outputting, by the CPU, the content of the fifth random memory.

2. The method of claim 1, wherein the first offset is configured to indicate an offset address which is relative to a base address in the second random memory; the second offset is configured to indicate an offset address which is relative to a base address in the fifth random memory.

3. The method of claim 1, wherein step 2 comprises reading one word corresponding to a position obtained by shifting the first offset left from the base address of the second random memory and writing the word into the first arithmetic register.

4. The method of claim 1, wherein the multiply-add module is configured to implement a multiplication operation and an addition operation supported by the CPU.

5. The method of claim 1, wherein invoking, by the CPU, a multiply-add module to perform an operation of multiplying content of the first arithmetic register and content of the first random memory and adding a multiplication result to content of the fifth random memory in step 3 comprises:

step 201, comprising: determining, by the CPU, whether the first offset is 0, executing step 210 if the first offset is 0; executing step 202 if the first offset is not 0;

step 202, comprising: initializing a carry register and initializing an index variable;

step 203, comprising: obtaining, by the CPU, one word from the first random memory according to the index variable and writing the word into a third arithmetic register, obtaining one word from the fifth random memory according to the index variable and writing the word into a fourth arithmetic register;

step 204, comprising: multiplying, by the CPU, content of the first arithmetic register with content of the third arithmetic register, and adding a multiplication result to content of the fourth arithmetic register to obtain a first computing result;

step 205, comprising: adding, by the CPU, the first computing result to content of the carry register to obtain a second computing result;

step 206, comprising: writing, by the CPU, a first word of a high bit of the second computing result into the carry register and writing rest words of the second computing result into the fifth random memory according to the index variable;

step 207, comprising: determining, by the CPU, whether the index variable is equal to a preset word length, executing step 209 if the index variable is equal to the preset word length;

executing step 208 if the index variable is not equal to the preset word length;

step 208, comprising: adding 1 to the index variable and going back to execute step 203;

step 209, comprising: reading, by the CPU, content of the carry register and writing the content of the carry register into the fifth random memory according to the index variable; and step 210, comprising: outputting, by the CPU, content of the fifth random memory as a computing result of step 3.

6. The method of claim 5, wherein step 203 comprises obtaining one word at a storage position corresponding to a current index variable in the first random memory and writing the word into the third arithmetic register; obtaining one word at the storage position corresponding to the current index variable in the fifth random memory and writing the word into the fourth arithmetic register.

7. The method of claim 5, wherein writing rest words of the second computing result into the fifth random memory according to the index variable in step 206 comprises writing the rest words the second computing result, except for the first word of the high bit, into a storage position corresponding to a current index variable in the fifth random memory ordered from a low bit to a high bit.

8. The method of claim 1, wherein writing a computing result obtained into the fifth random memory ordered from a low bit to a high bit according to the second offset in step 3 and step 5 comprises writing the computing result from the position obtained by shifting the second offset left from the base address of the fifth random memory ordered from a low bit to a high bit.

9. The method of claim 1, wherein reading, by the CPU, one word from the fifth random memory according to the second offset and writing the word into the second arithmetic register in step 4 comprises reading a word corresponding to a position obtained by shifting a second offset left from the base address of the fifth random memory and writing the word into the second arithmetic register.

10. The method of claim 1, wherein invoking the multiply-add module to multiply the content of the fourth register with the content of the third random memory and to add a multiplication result to the content of the fifth random memory in step 5 comprises:

step 301, comprising: determining, by the CPU, whether the first offset is 0, executing step 310 if the first offset is 0; executing step 302 if the first offset is not 0;

step 302, comprising: initializing a carry register and initializing an index variable;

step 303, comprising: obtaining, by the CPU, one word form the third random memory according to the index variable and writing the word into a third arithmetic register; obtaining one word from the fifth random memory according to the index variable and writing the word into a fourth arithmetic register;

step 304, comprising: multiplying, by the CPU, content of the third arithmetic register with content of the fourth register and adding a multiplication result to content of the fourth arithmetic register to obtain a third computing result;

step 305, comprising: adding, by the CPU, the third computing result to content of a carry register to obtain a fourth computing result;

step 306, comprising: writing, by the CPU, a first word of a high bit of the four computing result into the carry register and writing rest words of the four computing result into the fifth random memory according to the index variable;

step 307, comprising: determining, by the CPU, whether the index variable is equal to a preset word length, execute step 309 if the index variable is equal to the preset word length;

execute step 308 if the index variable is not equal to the preset word length;

step 308, comprising: adding 1 to the index variable and going back to execute step 303;

step 309, comprising: reading, by the CPU, content of the carry register and writing the content of the carry register into a fifth random memory according to the index variable; and step 310, comprising: outputting, by the CPU, content of the fifth random memory as a operating result of step 5.

11. The method of claim 10, wherein writing a subtract result into the fifth random memory ordered from a low bit to a high bit according to the second offset in step 9 comprises:

writing the subtract result into the position obtained by shifting the second offset left from the base address of the fifth random memory ordered from a low bit to a high bit.

* * * * *